(12) United States Patent
Fujita et al.

(10) Patent No.: US 7,917,849 B2
(45) Date of Patent: Mar. 29, 2011

(54) INFORMATION PROCESSOR AND INFORMATION PROCESSING PROGRAM STORED ON A COMPUTER-READABLE RECORDING MEDIUM

(75) Inventors: Yasuyuki Fujita, Nagoya (JP); Kazuhiko Iwanaga, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 1324 days.

(21) Appl. No.: 11/436,916

(22) Filed: May 18, 2006

(65) Prior Publication Data

US 2006/0288295 A1 Dec. 21, 2006

(30) Foreign Application Priority Data

May 24, 2005 (JP) ................................ 2005-150411

(51) Int. Cl.
*G06N 3/00* (2006.01)
(52) U.S. Cl. ...................................................... 715/255
(58) Field of Classification Search .................. 715/234, 715/243, 254, 255
See application file for complete search history.

(56) References Cited

U.S. PATENT DOCUMENTS

| | | | | |
|---|---|---|---|---|
| 5,428,721 | A * | 6/1995 | Sato et al. ...................... | 345/650 |
| 5,835,919 | A | 11/1998 | Stern et al. | |
| 6,519,764 | B1 * | 2/2003 | Atkinson et al. .............. | 717/120 |
| 7,167,254 | B1 * | 1/2007 | Abe .............................. | 358/1.15 |
| 7,503,012 | B2 * | 3/2009 | Chen et al. ..................... | 715/769 |
| 2005/0097465 | A1 * | 5/2005 | Giesen et al. ................. | 715/700 |

FOREIGN PATENT DOCUMENTS

| | | |
|---|---|---|
| EP | 0942361 A2 | 9/1999 |
| JP | 2001-331090 | 11/2001 |
| JP | 2003-067210 | 3/2003 |

OTHER PUBLICATIONS

Lorenz J, So Funktioniert, Jul. 1, 1996, pp. 208-211, XP000598137, Chip Zeitschrift Fuer Mikrocomuter-Technik, Vogel Verlag. Wurzburg, DE.

Velazquez D J, Leveraging Your Open Architecture MMI Using Activex, ODBC, & VBA, ISA Tech/ Expo Technology Update, Instrument Society of America, Res. Triangle, NC, US, vol. 1 No. Part 1, 1997, pp. 181-190.

Morin D R, Window 3.0 and DDE Help PCS Move Data Around the Plant Floor, I&CS-Industrial and Process Control Magazine, Chilton Company. Radnor, Pennsylvania, US vol. 64, No. 4, Apr. 1, 1991, pp. 77-79.

Frey G, Registry Angezapft Windows-Registrierdatenbank in VBA Einfach Nutzen, CT Magazin Fuer Computer Technik, Heise Zeitschriften Verlag, Hannover, DE, No. 11, May 22, 2000, pp. 240-242, 244, 246.

Nebelo R, Xpedition in VBA Neue Word-Objekte Zur Makroentwicklung Nutzen, CT Magazin Fuer Computer Technik, Heise Zeitschriften Verlag, Hannover, DE, No. 16, Jul. 30, 2001, pp. 192-201.

* cited by examiner

*Primary Examiner* — Kyle R Stork
(74) *Attorney, Agent, or Firm* — Day Pitney LLP

(57) ABSTRACT

Data input processing is initiated when an ADD-IN button is pressed in a condition where a data cell of a spreadsheet application is selected. Whether an editor is already activated is determined and, if such is the case, a current mode of the currently activated editor is detected and, if it is activated in an edit mode and an activation mode set in activation setting processing is the edit mode, acquired data is added to the currently activated editor and put in a selected state and displayed on an edit screen.

4 Claims, 13 Drawing Sheets

INFORMATION PROCESSOR AND INFORMATION PROCESSING PROGRAM STORED ON A COMPUTER-READABLE RECORDING MEDIUM

This application claims priority from Japanese patent application serial number 2005-150411, filed May 24, 2005, the contents of which are hereby incorporated by reference.

BACKGROUND OF THE INVENTION

1. Field of the Invention

The disclosure relates to an information processor and an information processing program stored on a computer-readable recording medium.

2. Description of the Related Art

In an information processor such as a personal computer, generally, a plurality of applications is activated and operated. Moreover, these applications are not only used independently of each other but also frequently linked with each other and data generated by one of them is input to the others. For example, there may be a case where data input by a spreadsheet application is input to a database application. Although data may be thus transferred across applications easily by using a function, such as copy and paste functions, prepared by the operating system (OS), it may become difficult if the data is large.

To solve this problem and transfer data smoothly between applications, a function is provided to one of these applications to activate the other applications and transfer data to them, thus establishing a linkage among them. An append program having such a function is referred to as an add-in program, add-on program, or a plug-in program (hereinafter referred to as add-in program) (see, for example, Japanese Patent Application Laid Open Publication 2003-67210 and Japanese Patent Application Laid Open Publication No. 2001-331090).

In a case where such an add-in program etc. has a function of application activation and data input, irrespective of whether an activation-intended application had already been activated or not, this application is always activated newly or only data that has been input is displayed in disregard of already accumulated data. Therefore, there has been such a problem that a job an operator has done hitherto may be lost or his operation has been become error-prone.

SUMMARY OF THE INVENTION

To solve these problems the disclosure has been developed, and it is an object of the disclosure to provide an information processor and an information processing program stored on a computer-readable recording medium that can add to existing data when the data is transferred between applications via an add-in program etc.

According to a first aspect, an information processor comprises a display that includes a display screen, an acquisition device that acquires data selected in a first application, an activation command input device that inputs a command causing the first application to activate a second application that has a plurality of modes including an edit mode and a print image display mode, an activation control device that activates, in accordance with an input from the activation command input device, the second application in a condition where the data acquired by the acquisition device is input, a determining device that determines whether the second application is already activated when having received the input from the activation command input device, and a data addition device that inputs the data from the acquisition device in addition to data already accumulated in the second application currently activated, if the determining device determines that the second application is already activated.

According to a second aspect, an information processor comprises a display that includes a display screen, an activation command input device that inputs a command causing a first application to activate a second application that has a plurality of modes including an edit mode and a print image display mode and a controller that acquires data selected in the first application, activates, in accordance with an input from the activation command input device, the second application in a condition where the acquired data is input, determines whether the second application is already activated when having received the input from the activation command input device, and inputs the acquired data in addition to data already accumulated in the second application currently activated, if the second application is already activated.

According to a third aspect, an information processing program stored on a computer-readable recording medium comprises a display step of performing display, an acquisition step of acquiring data selected in a first application, an activation command input step of inputting a command causing the first application to activate a second application that has a plurality of modes including an edit mode and a print image display mode, an activation control step of activating, in accordance with an input in the activation command input step, the second application in a condition where the data acquired in the acquisition step is input, a determining step of determining whether the second application is already activated, when having received the input in the activation command input step, and a data addition step of inputting the data acquired in the acquisition step in addition to data already accumulated in the second application currently activated, if the determining step determines that the second application is already activated.

BRIEF DESCRIPTION OF THE DRAWINGS

Exemplary embodiments of the disclosure will be described below in detail with reference to the accompanying drawings, in which.

DETAILED DESCRIPTION OF THE PREFERRED EMBODIMENTS

The following will describe exemplary embodiments with reference to drawings. In the following description, a personal computer 2 connected to a printer 1 is enumerated as an "information processor" related to the disclosure. In this personal computer 2, an "information processing program" related to the disclosure is installed. First, the printer 1 and the personal computer 2 are described with reference to FIGS. 1 and 2.

Figure 1:
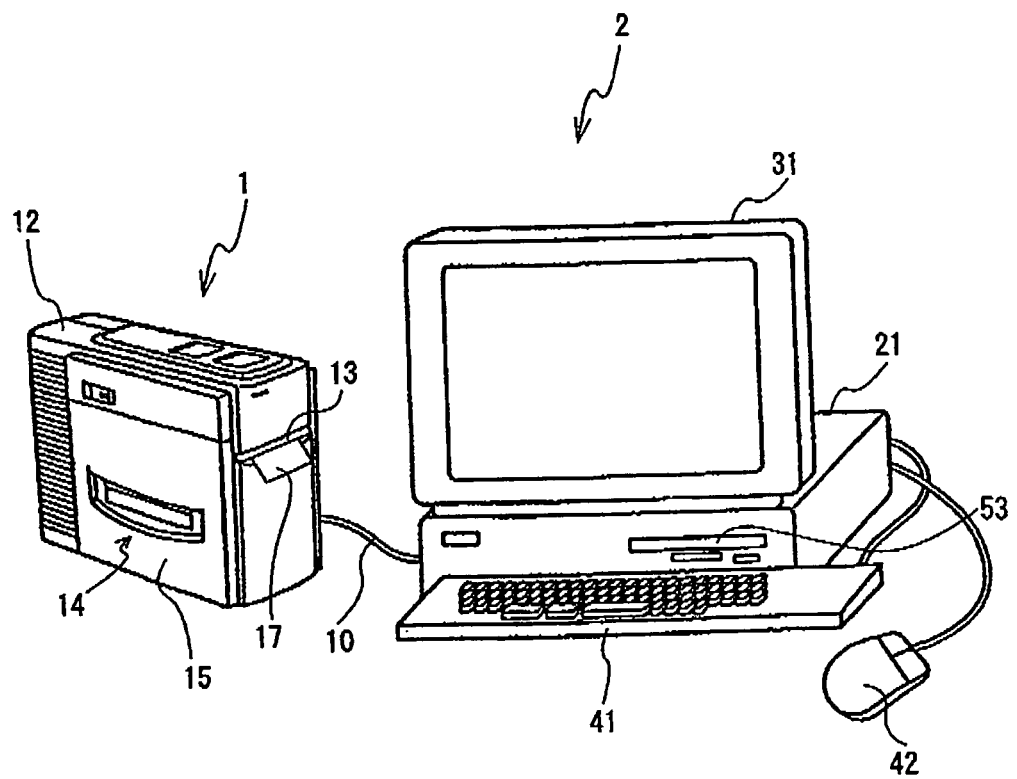
FIG. 1 is an external perspective view of an outline of a printer and a personal computer.

As shown in FIG. 1, the personal computer 2 and the printer 1 are connected to each other via a USB cable 10 that complies with a USB standard so that data may be transferred therebetween through the USB cable 10. The personal computer 2, which is a known one, comprises a body 21 equipped with a CPU 50 etc. (see FIG. 2), a monitor 31, a keyboard 41, and a mouse 42 as shown in FIG. 1. The monitor 31, the keyboard 41, and the mouse 42 are each connected to the body 21 by a connection cable.

Further, as shown in FIG. 1, the printer 1 is encased in a roughly cuboid-shaped casing 12 and has a discharge outlet 13 formed in its front surface (surface in a right-hand front direction in FIG. 1) for discharging a tape 17. The casing 12 also has a tape cassette housing 14 inside its left side surface in such a manner that a tape cassette can be attached detachably by opening a cover 15 mounted over the left side surface of the casing 12. This tape cassette housing 14 is equipped with a print station which causes the tape 17 to travel between a thermal head having a plurality of heating elements and a platen roller abutted by this thermal head so that information may be printed on this tape 17. The tape 17 in an attached tape cassette has information printed thereon by the print station and is cut off by a tape cutter of the print station and discharged from the discharge outlet 13.

Figure 2:
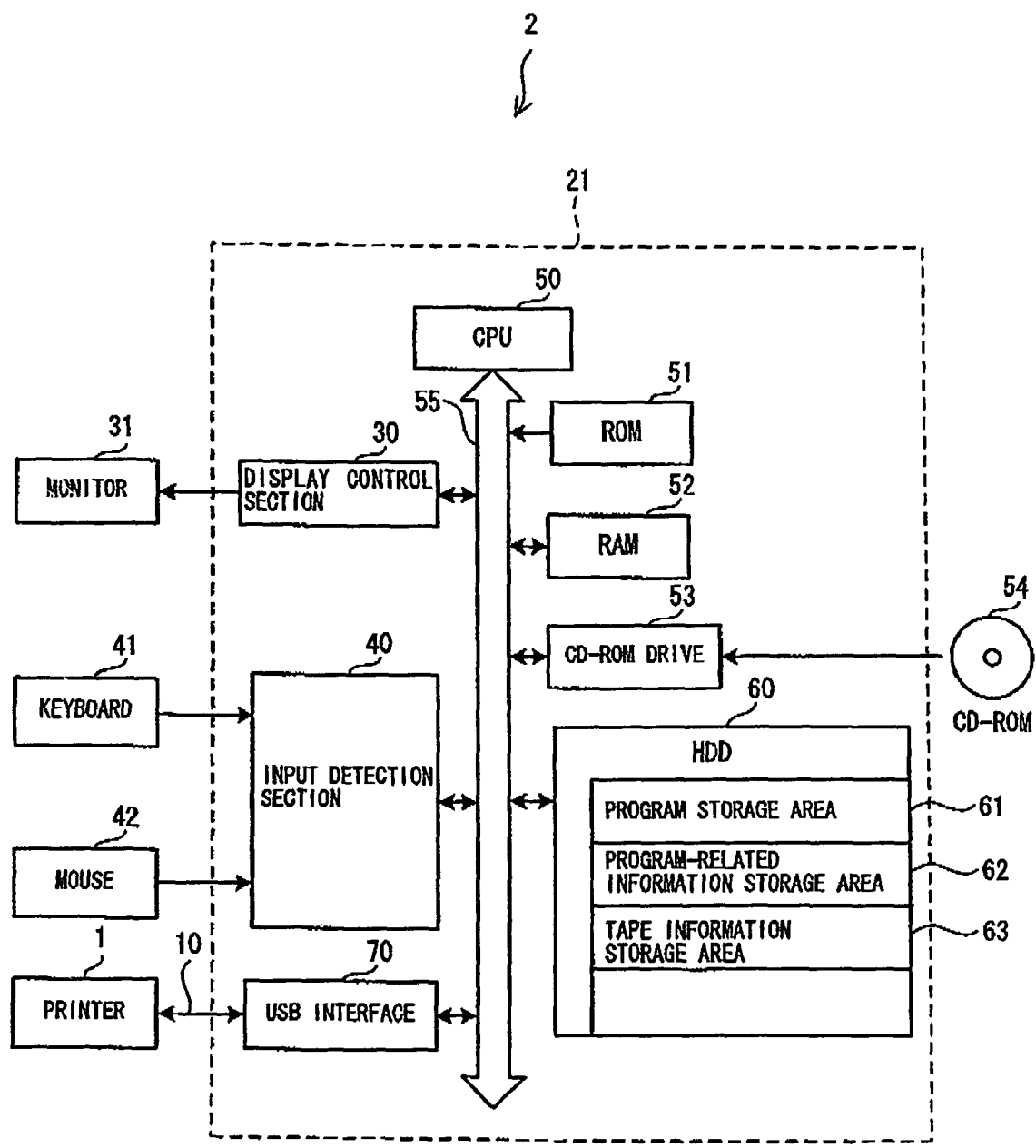
FIG. 2 is a block diagram of an electrical configuration of the personal computer.

Next, an electrical configuration of the personal computer 2 is described with reference to FIG. 2. As shown in FIG. 2, the personal computer 2 has the CPU 50 that controls the personal computer 2. To this CPU 50 are connected a ROM 51, a RAM 52, a CD-ROM drive 53, and a HDD 60 via a bus 55. The ROM 51 stores programs such as a BIOS to be executed by the CPU 50. The RAM 52 stores data temporarily. The CD-ROM drive 53, when a CD-ROM 54 storing data is inserted in it, reads the data. The HDD 60 is a storage device for storing data.

The HDD 60 has a program storage area 61, a program-related information storage area 62, a tape information storage area 63, etc. The program storage area 61 stores a variety of programs to be executed by the personal computer 2. The program-related information storage area 62 stores information such as settings, initial values, data etc. required to execute the programs. The tape information storage area 63 stores information about a tape which is used in the printer 1.

To the CPU 50, further, a USB interface 70, a display control section 30, and an input detection section 40 are connected via the bus 55. The USB interface 70 is provided for communication with external devices including the printer 1. The display control section 30 performs screen display processing on the monitor 31 in order to display an operation screen to a user. The input detection section 40 is connected to the keyboard 41 and the mouse 42 with which the user inputs information, to thereby detect such an input. It is to be noted that the personal computer 2 may be equipped with a flexible disk drive, an input/output section for voice etc., and a variety of interfaces, which are not shown.

It is to be noted that the CD-ROM 54 stores software in which an information processing program is incorporated, settings and data to be used in execution of this program, etc., so that upon introduction of the CD-ROM 54, they may be loaded into the program storage area 61 and the program-related information storage area 62 provided in the HDD 60 from this CD-ROM 54. It is to be noted that a medium for acquiring the information processing program of the personal computer 2 and data etc. to be used thereby may be stored not only on the CD-ROM 54 but also on any other recording media such as a flexible disk and an MO (Magnetic Optical disk). Further, the personal computer 2 may be connected to a network so that this information processing program thereof and data etc. to be used thereby may be acquired from any other terminal on this network.

Figure 3:
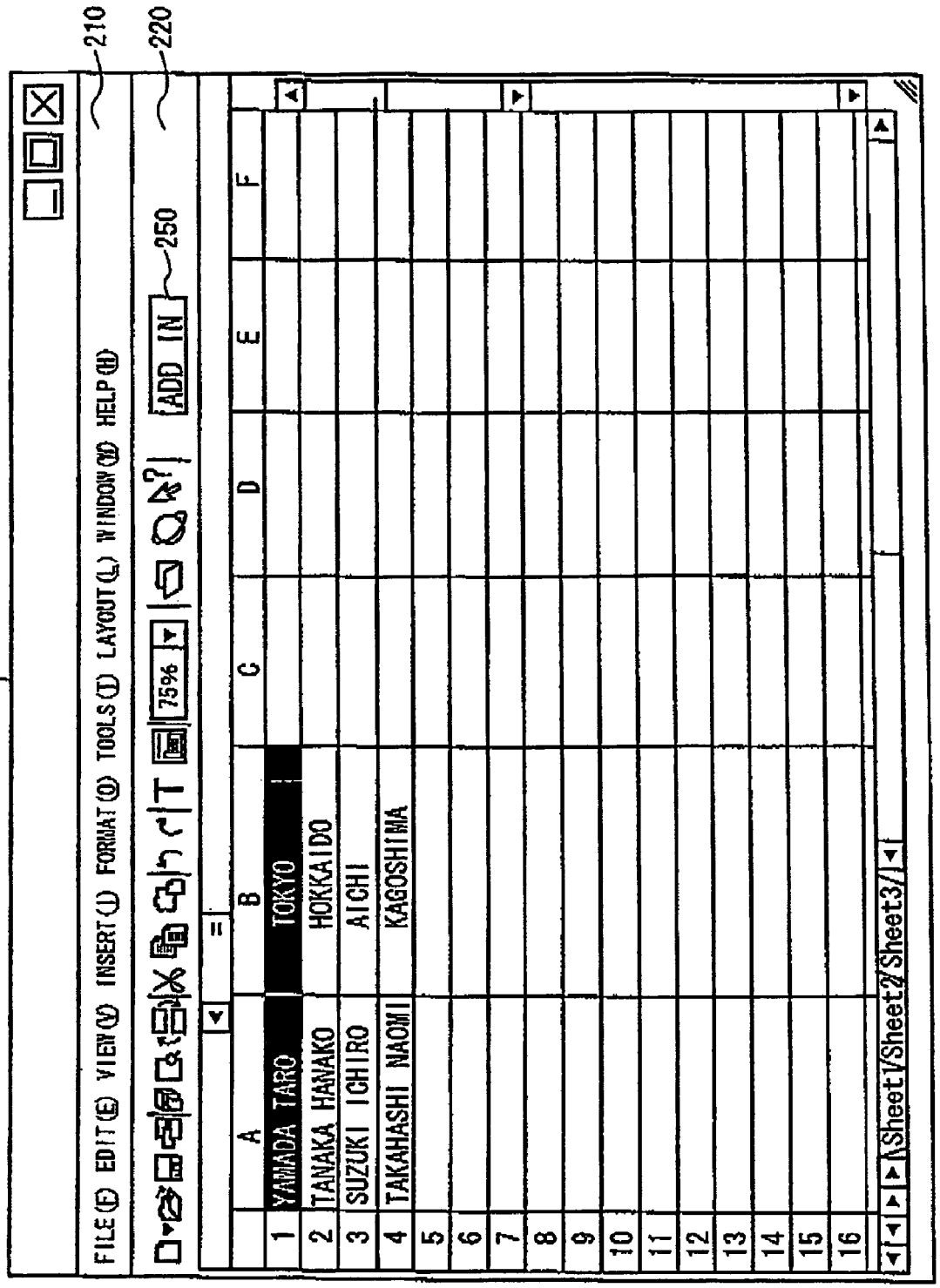
FIG. 3 is a table of an image of a spreadsheet application.

Next, a spreadsheet application 200, which is activated in the personal computer 2, is described with reference to FIG. 3. The spreadsheet application 200 is displayed on the monitor 31 of the personal computer 2, to receive an input of data and a command through an operation of the keyboard 41 or the mouse 42. As shown in FIG. 3, the spreadsheet application 200 is a known application having a tabular form comprised of rows (1, 2, . . . ) and columns (A, B, . . . ). Data can be input into a cell specified by a row and a column.

At a top of the spreadsheet application 200, a menu bar 210 and a tool bar 220 are provided to command operations. The tool bar 220 has an ADD-IN button 250 for executing an add-in program which is used to input selected data to a later-described editor 100. For example, if the mouse 42 is clicked on the ADD-IN button 250 in a condition where cells A1 and B1 are selected as shown in FIG. 3, the editor 100 appears in a condition where contents of the cells A1 and B1 are input as described later.

Next, the editor 100, which is activated by the personal computer 2, is described with reference to FIGS. 4 and 5. The editor 100 is displayed on the monitor 31 of the personal computer 2 so that it may receive an input of data or a command through an operation of the keyboard 41 and the mouse 42.

Figure 4:
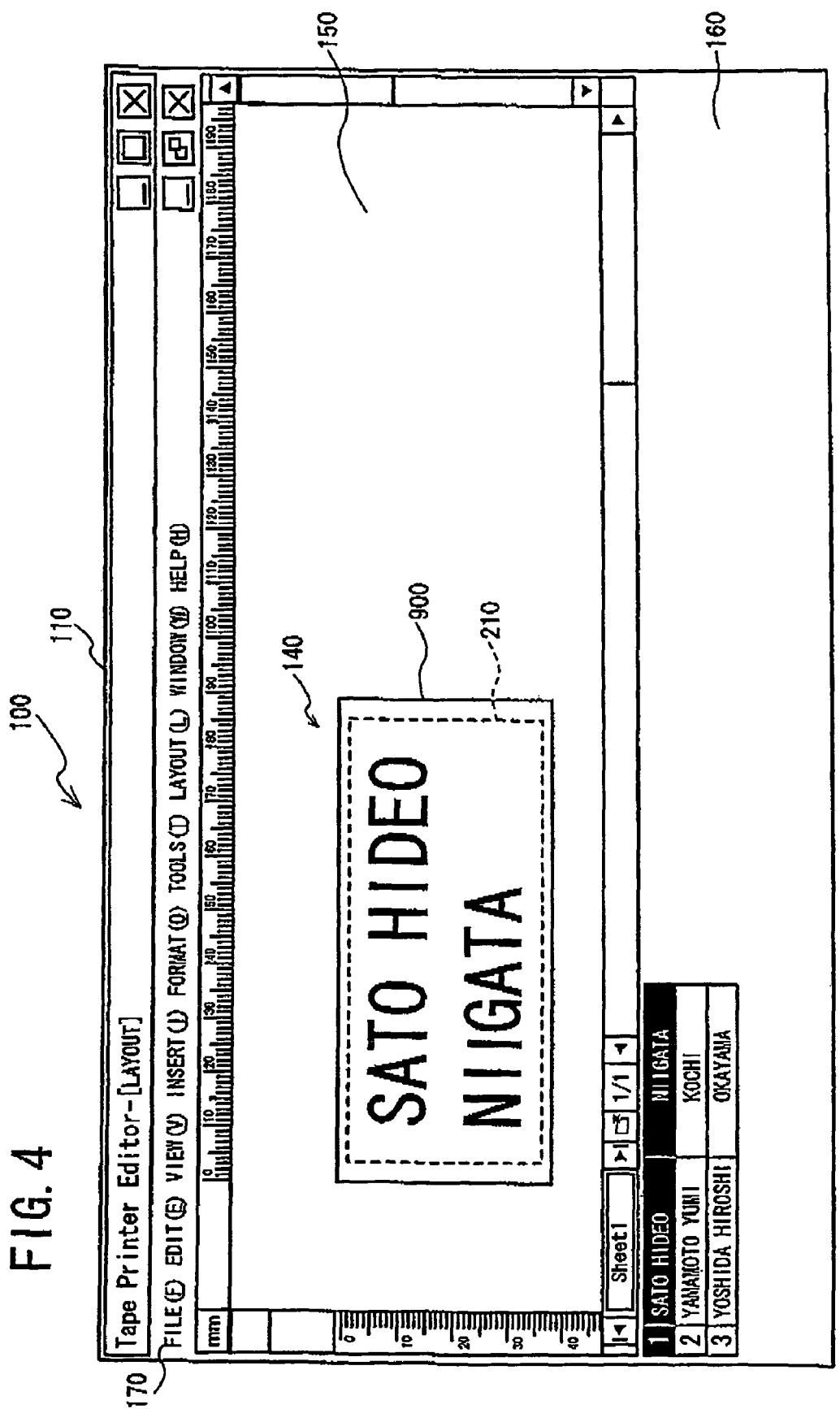
FIG. 4 is an illustration of an image of an edit screen of an editor.
Figure 5:
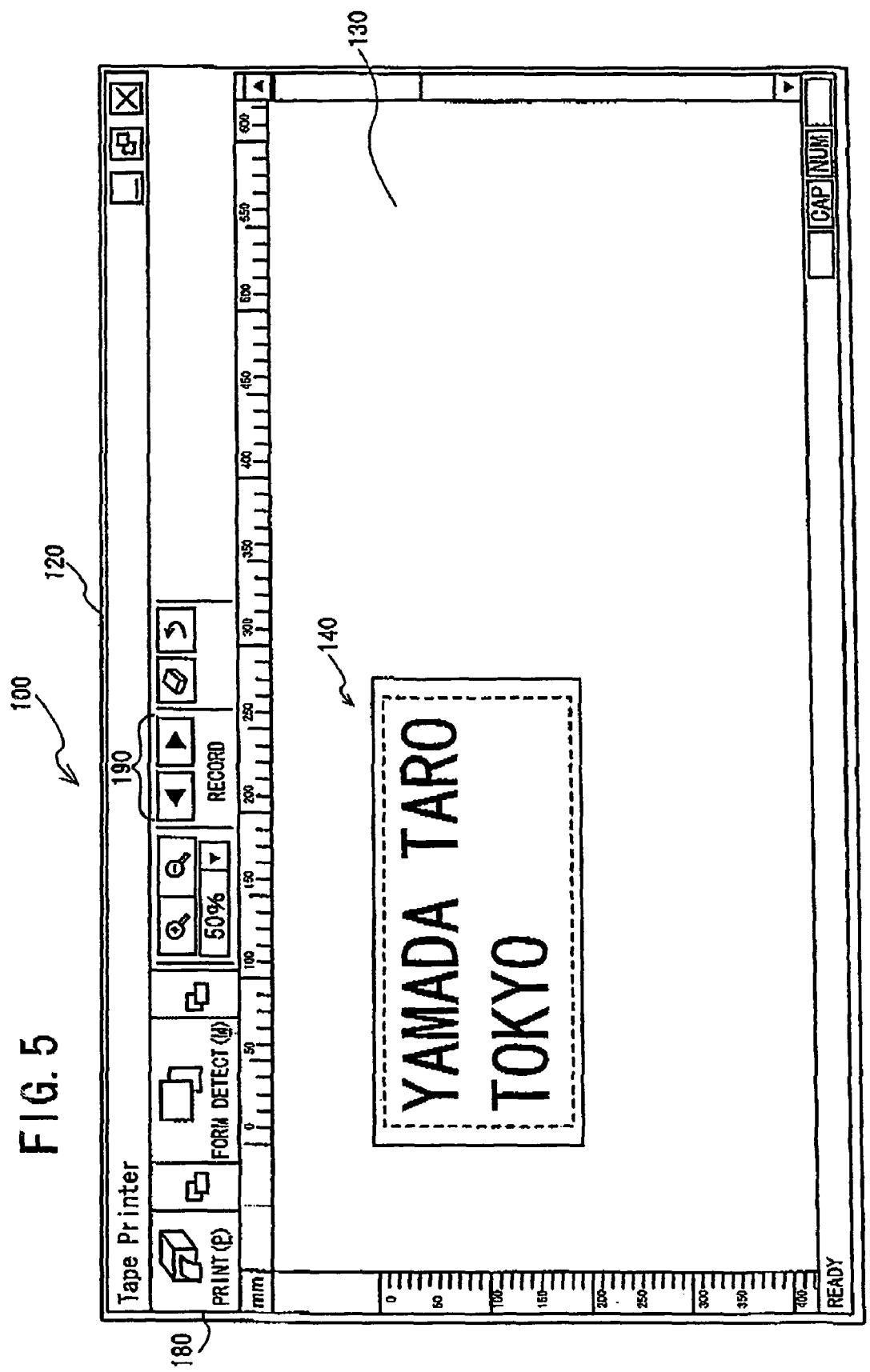
FIG. 5 is an illustration of an image of a preview screen of the editor.

As shown in FIG. 4, at a top of an edit screen 110 of the editor 100, a menu bar 170 is provided for commanding operations. Further, in an upper half of the edit screen 110, a working area 150 is provided for editing characters etc. to be printed by the printer 1, in which a print image 140 is displayed in which an object 210 to be printed is laid out. In the print image 140, a form frame 900 indicating a fringe of a form is displayed, in which the object 210 is laid out. In a lower half of the edit screen 110, a database display region 160 is provided, in which stored contents of hitherto accumulated data are displayed as an aggregate of records having a field as if they are a database.

If a specific record is selected when data is displayed in the database display region 160, contents of this selected record are displayed in a condition where they are reflected on an object in the working area 150. In an example of FIG. 4, a record of a first row is selected and its contents are displayed in the object 210.

Further, the editor 100 can switch between the edit screen 110 (FIG. 4) which is displayed during an edit mode for performing such edition and a preview screen 120 (FIG. 5) which is displayed during a preview mode for previewing a print image. As shown in FIG. 5, at an top of the preview screen 120, a tool bar 180 is provided for commanding operations. At a bottom of, the tool bar 180, a print image display region 130 is provided, in which a print image 140 is displayed. On the preview screen 120, a record to be selected can be switched using a record switchover button 190 in the tool bar 180, to change contents of a print image to be previewed.

Next, information processing which is performed in the personal computer 2 having the above-described configuration is described with reference to FIGS. 6 to 9.

Figure 6:
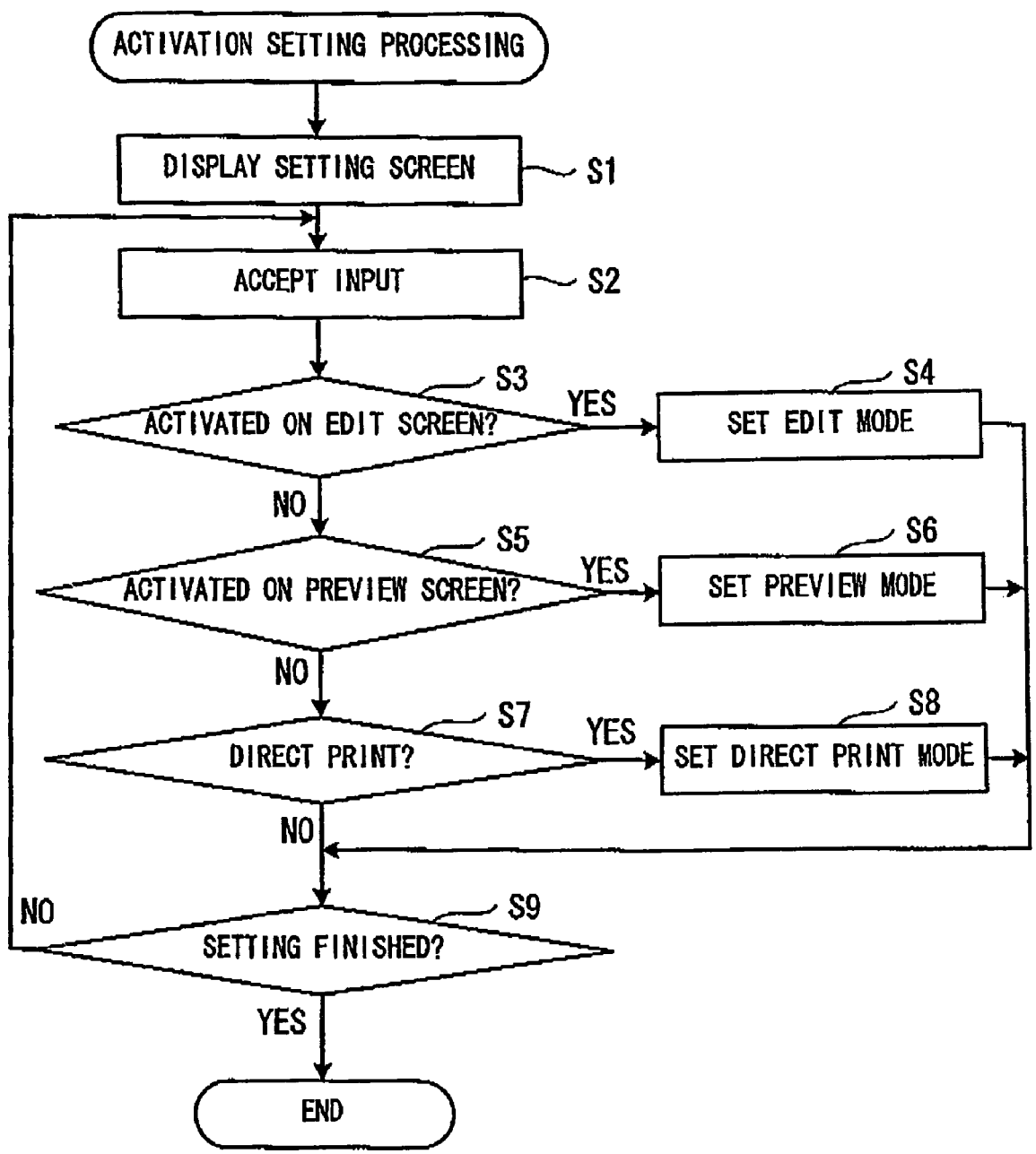
FIG. 6 is a flowchart of activation setting processing.

First, activation setting processing of permitting an operator to select in which mode the editor 100 is to be activated before the add-in program is executed so that setting may be performed is described with reference to FIGS. 6 and 7. In the present embodiment, the activation setting processing starts when an activation setting menu is selected from the spreadsheet application 200. However, besides such an approach of initiating the processing from the spreadsheet application 200, the processing may be set by the editor 100 or activated as an independent program so that setting can be performed.

Figure 7:
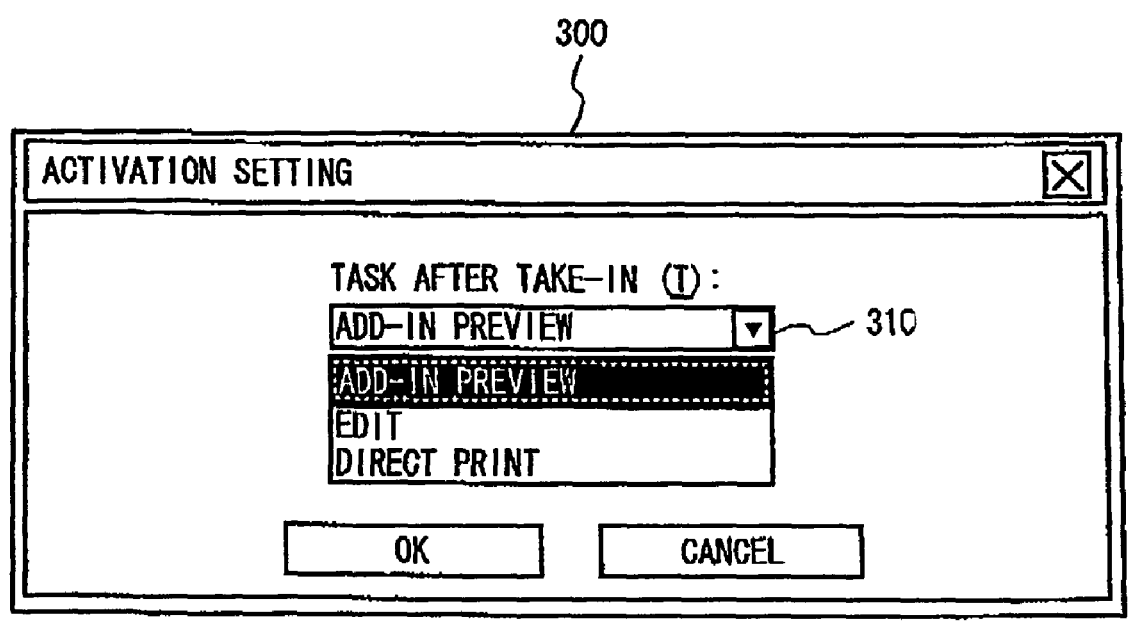
FIG. 7 is an illustration of an image of a setting screen of the activation setting processing.

When the activation setting processing starts, a setting screen 300 such as shown in FIG. 7 appears for performing activation setting (S1). On the setting screen 300, it is possible to select and set from among mode options prepared in a combo box 310 any mode in which data is to be input to activate the editor 100. In the present embodiment, three options are prepared: "add-in preview", "edit", and "direct print". If "add-in preview" is selected, the editor 100 is activated by the add-in program in the preview mode. If "edit" is selected, the editor 100 is activated by the add-in program in the edit mode and the edit section 110 is displayed. If "direct print" is selected, direct printing is performed by the add-in program by using a print function of the editor 100.

Next, an input by use of the keyboard 41 or the mouse 42 or the button on the screen is accepted (S2). The process determines whether contents of the accepted input intend to select "edit" indicating activation on the edit screen (S3). If "edit" is selected (YES at S3), the edit mode is stored as an activation setting (S4). Then, the process goes to S9.

If "edit" is not selected (NO at S3), the process determines whether "add-in preview" indicating activation on the preview screen is selected (S5). If "add-in preview" is selected (YES at S5), the preview mode is stored as the activation setting (S6). Then, the process goes to S9.

If "add-in preview" is not selected (NO at S5), the process determines whether "direct print" is selected (S7). If "direct print" is selected (YES at S7), the direct print mode is stored as the activation setting (S8). Then, the process goes to S9.

If "direct print" is not; selected (NO at S7), the process determines whether it is commanded to end the activation setting (S9). If it is not an end command (NO at S9), the process returns to S2 to receive an input again. If it is an end command (YES at S9), the activation setting processing ends.

Next, data input processing in a case where the add-in program is executed by pressing the ADD-IN button 250 of the spreadsheet application 200 is pressed is described with reference to FIGS. 3, 8, and 9. If the ADD-IN button 250 is pressed using the mouse 42 or an add-in command is selected from the menu by the operator in a condition where desired cells (A1 and B1, for example) in the spreadsheet application 200 shown in FIG. 3, the add-in program is executed to start the data input processing.

Figure 8:
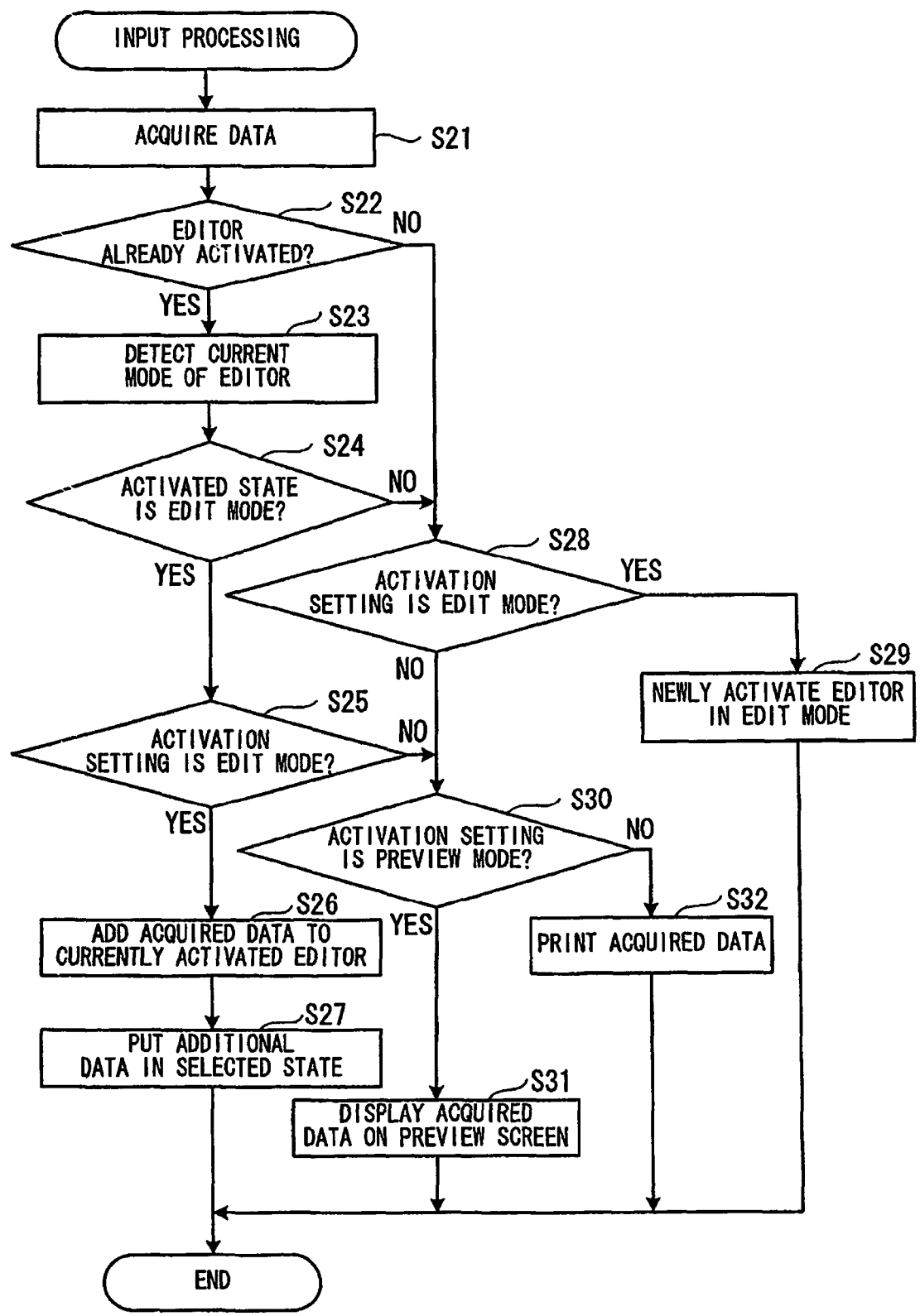
FIG. 8 is a flowchart of data input processing by an add-in program.
Figure 9:
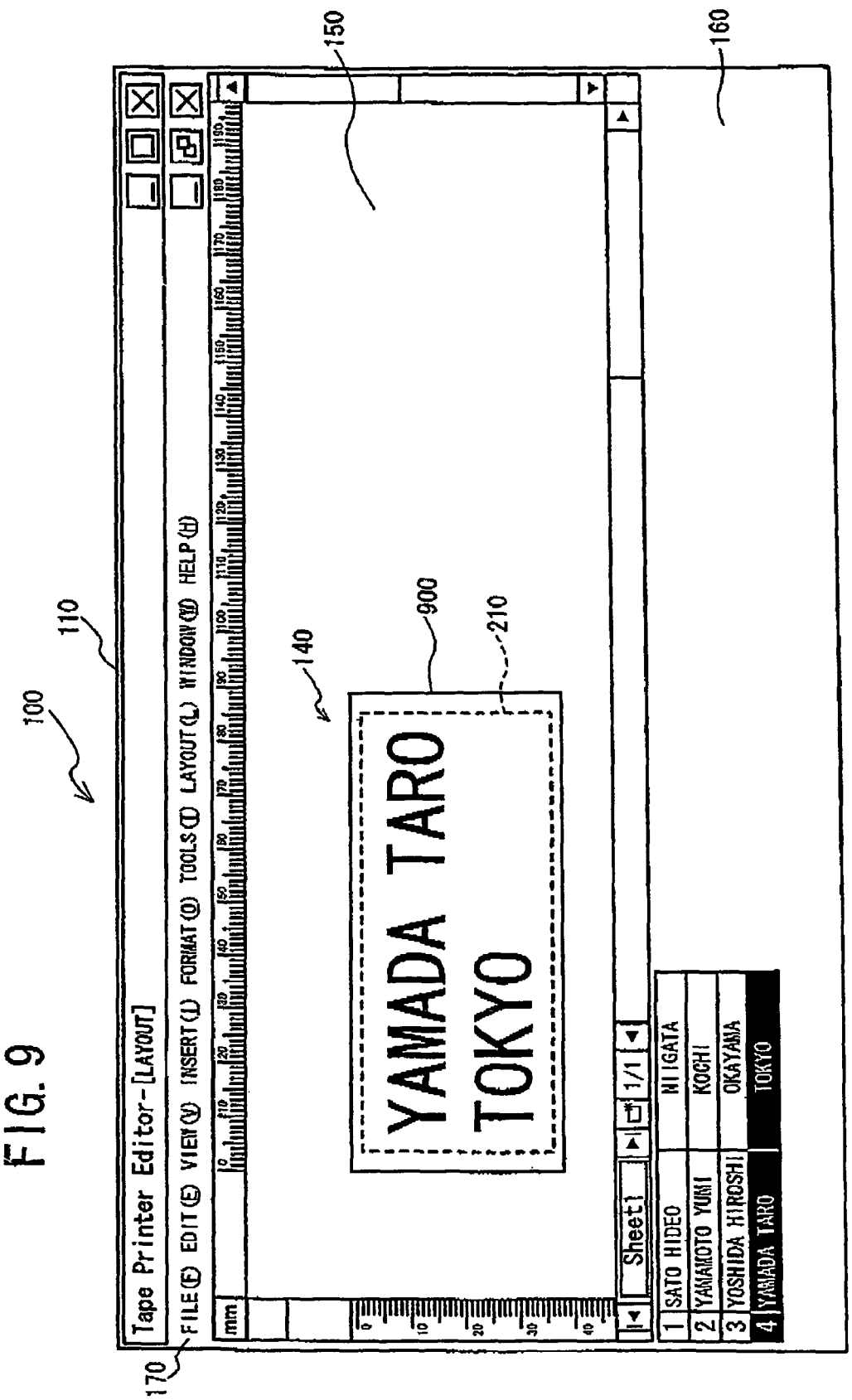
FIG. 9 is an illustration of an image of an edit screen on which data is input by the add-in program.

As shown in FIG. 8, when the data input processing starts, first, data (contents of the cells A1 and B1 of FIG. 3 in the above-described example) selected in the spreadsheet application 200 is acquired (S21). Next, the process determines whether the editor 100 is already activated (S22).

If the editor 100 is already activated (YES at S22) the process detects a current mode of the activated editor (S23). Then, based on the detected mode, the process determines whether activation state of the editor 100 is the edit mode (S24). If it is activated in the edit mode (YES at S24), the process determines whether an activation mode set in the activation setting processing (FIG. 6) is the edit mode (S25).

If the activation setting is the edit mode (YES at S25), the data acquired at S21 is added to the editor 100 in the activated state (S26) and this added data is put in a selected state and displayed on the edit screen 110 (S27). For example, in a case where, as described above, the add-in program is executed in a condition where "YAMADA TARO" of the first row in column A and "TOKYO" of the first row in column B are selected in the spreadsheet application 200 of FIG. 3 and the editor 100 is activated in the edit mode on the edit screen 110 shown in FIG. 4, as shown in FIG. 9, a record comprised of "YAMADA TARO" and "TOKYO" is added to data of the database display region 160 (S26) and put in the selected state (S27). Contents of the record in the selected state are reflected on the print image 140 in the working area 150 and displayed. Then, the processing ends.

On the other hand, if the editor is already activated (YES at S22) and the current mode of the editor 100 detected at S23 is not the edit mode (NO at S24), the process determines whether an activation mode set in the activation setting processing is the edit mode (S28). If the activation setting is the edit mode (YES at S28), the editor 100 is activated newly besides the currently activated editor 100. Then, only the data acquired at S21 is input as a record of the database display region 160 on the edit screen 110 and displayed in a condition where it is reflected on the print image 140 in the working area 150 (S29). Then, the processing ends.

If the current mode of the editor 100 is not the edit mode (NO at S24) and the set activation mode is not the edit mode (NO at S28) or if the current mode of the editor 100 is the edit mode (YES at S24) and the set activation mode is not the edit mode (NO at S25), the process determines whether the set activation mode is the preview mode (S30). If the activation setting is the preview mode (YES at S30) a preview screen 120 (see FIG. 5) appears which displays the print image 140 having the data input at S21 as contents of the object 210. Then, the processing ends.

If the set activation mode is not the preview mode either (NO at S30), the set activation mode must be the direct print mode, so that a command signal is transmitted to the printer 1 to print the data acquired at S21 (S32). Then, the processing ends.

On the other hand, in a case where the editor is not activated (NO at S22), if the activation setting is the edit mode (YES at S28), the editor 100 is activated newly, to input the data acquired at S21 as a record of the database display region 160 on the edit screen 110 and display it in a condition where it is reflected on the print image 140 in the working area 150 (S29). Then, the processing ends. If the activation setting is not the edit mode (NO at S28) but the preview mode (YES at S30), the preview screen 120 (see FIG. 5) appears which displays the print image 140 having the data acquired at S21 as contents of the object 210 (S31) and the processing ends. If the activation setting is the direct print mode (NO at S28, NO at S30), a command signal is transmitted to the printer 1 to print the data acquired at S21 (S32). Then, the processing ends.

In the above data input processing, if the editor 100 is already activated in the edit mode, data selected by the spreadsheet application 200 is added to the existing data hitherto accumulated on the edit screen 110 and displayed so that it can be edited in the editor 100. The operator can not only edit the input data but also can switch to the hitherto accumulated data and edit it, thus performing the processing flexibly. Further, if the preview mode or the direct print mode is specified as the activation setting, an intention to immediately confirm or print a print image of input data is recognized, so that only the input data would be processed instead of adding it to the existing data.

Next, a variant is described in which priority order between an activated state and an activation setting is set beforehand so that the data input processing may be performed in accordance with this presetting.

Figure 10:
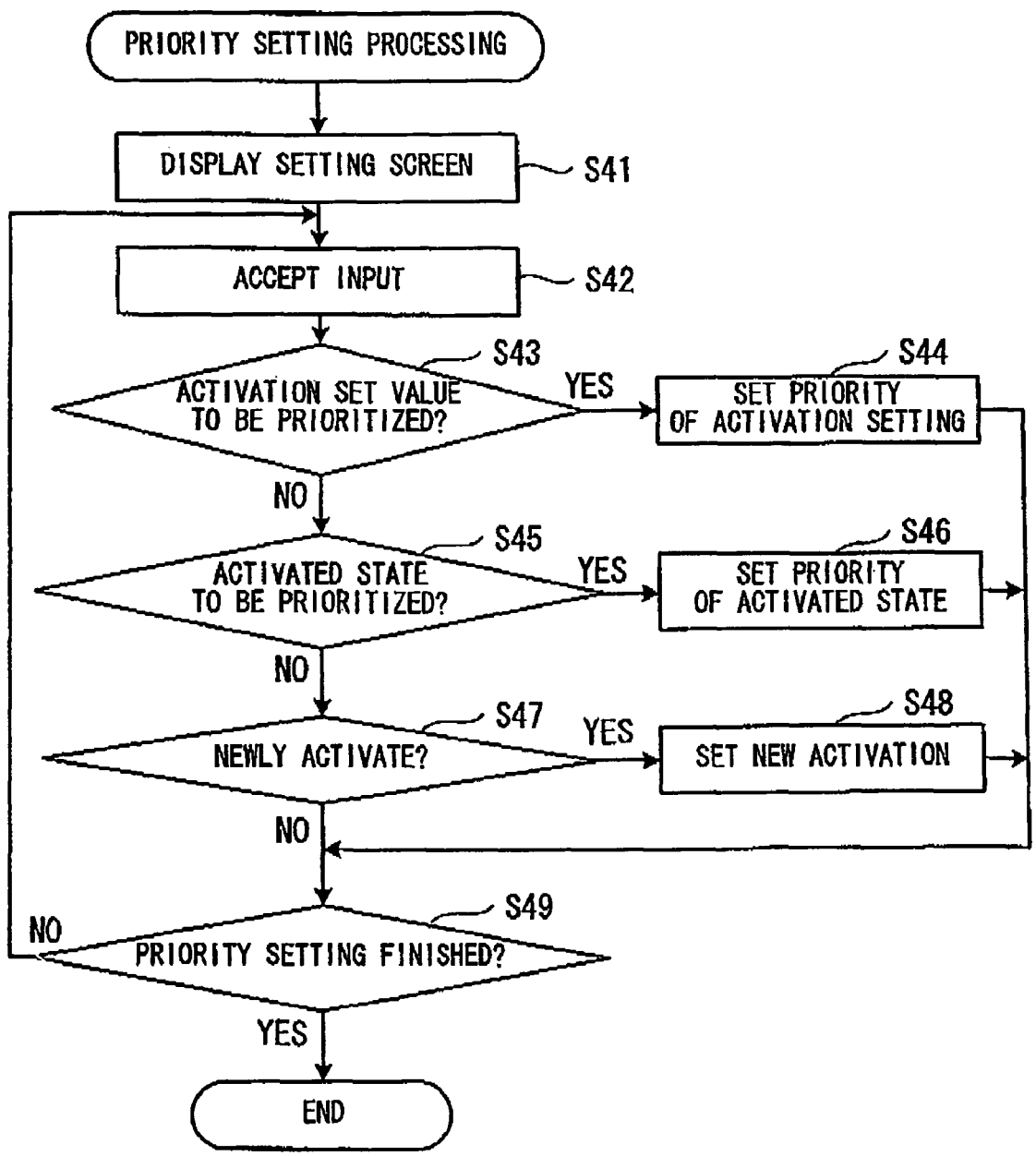
FIG. 10 is a flowchart of priority setting processing that determines priority order between an activated state and an activation setting.
Figure 11:
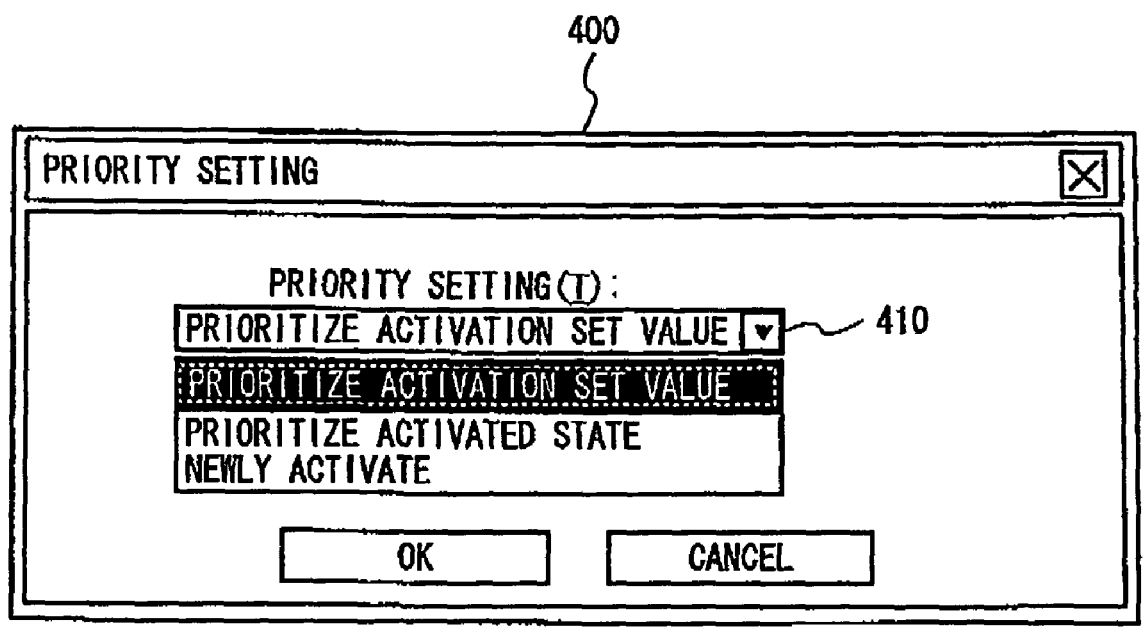
FIG. 11 is an illustration of an image of a setting screen of the priority setting processing.

First, with reference to FIGS. 10 and 11, a priority setting processing is described in which it is predefined in execution of the add-in program, whether to prefer a mode of the already activated editor 100 or an activation mode set in the activation setting processing in case where these modes are different from each other. In the present embodiment, the priority setting processing starts when the spreadsheet application 200 selects a priority presetting menu as in the case of the above-described activation setting processing. However, besides such an approach of initiating the processing from the spreadsheet application 200, the processing may be set by the editor 100 or executed as an independent program so that setting can be performed. Although an example of FIG. 11 has prepared a setting screen for performing only priority presetting, such a setting screen may be prepared so as to perform activation setting and priority setting simultaneously.

First, a setting screen 400 for priority setting such as shown in FIG. 11 is displayed (S41). On the setting screen 400, the following three priority options over an activation mode ("activated state") of the editor 100 and an activation mode ("activation set value") set in the activation setting processing are prepared: "to prefer an activation set value", "to prefer an activated state", and "to newly activate" another editor 100. Those three options can be selected using the mouse 42 or the keyboard 41 from a combo box 410.

Next, an input to the combo box 410 etc. through the keyboard 41 or the mouse 42 is accepted (S42). The process determines whether the contents of the accepted input prioritizes an activation set value set in the activation setting processing (S43). If the activation set value is prioritized (YES at S43), a priority of an activation setting is stored as a priority setting (S44). Then, the process goes to S49.

If the activation set value is not prioritized (NO at S43), the process determines whether an activated state, which is an activation mode of the editor 100, is prioritized (S45). If the activated state is prioritized (YES at S45), an activated state priority is stored as the priority setting (S46). Then, the process goes to S49.

If the activated state is not prioritized, (NO at S45), the process determines whether to make setting for newly activating the editor 100 even if the editor 100 is already activated (S47). If the editor 100 is to be newly activated (YES at S47), new activation is stored as the priority setting (S48). Then, the process goes to S49.

If the editor 100 is not to be newly activated (NO at S47), the process determines whether it is commanded to end the priority setting (S49). If it is not an end command (NO at S49), the process return to S42 to accept an input again. If it is an end command (YES at S49), the priority setting processing ends.

Figure 12:
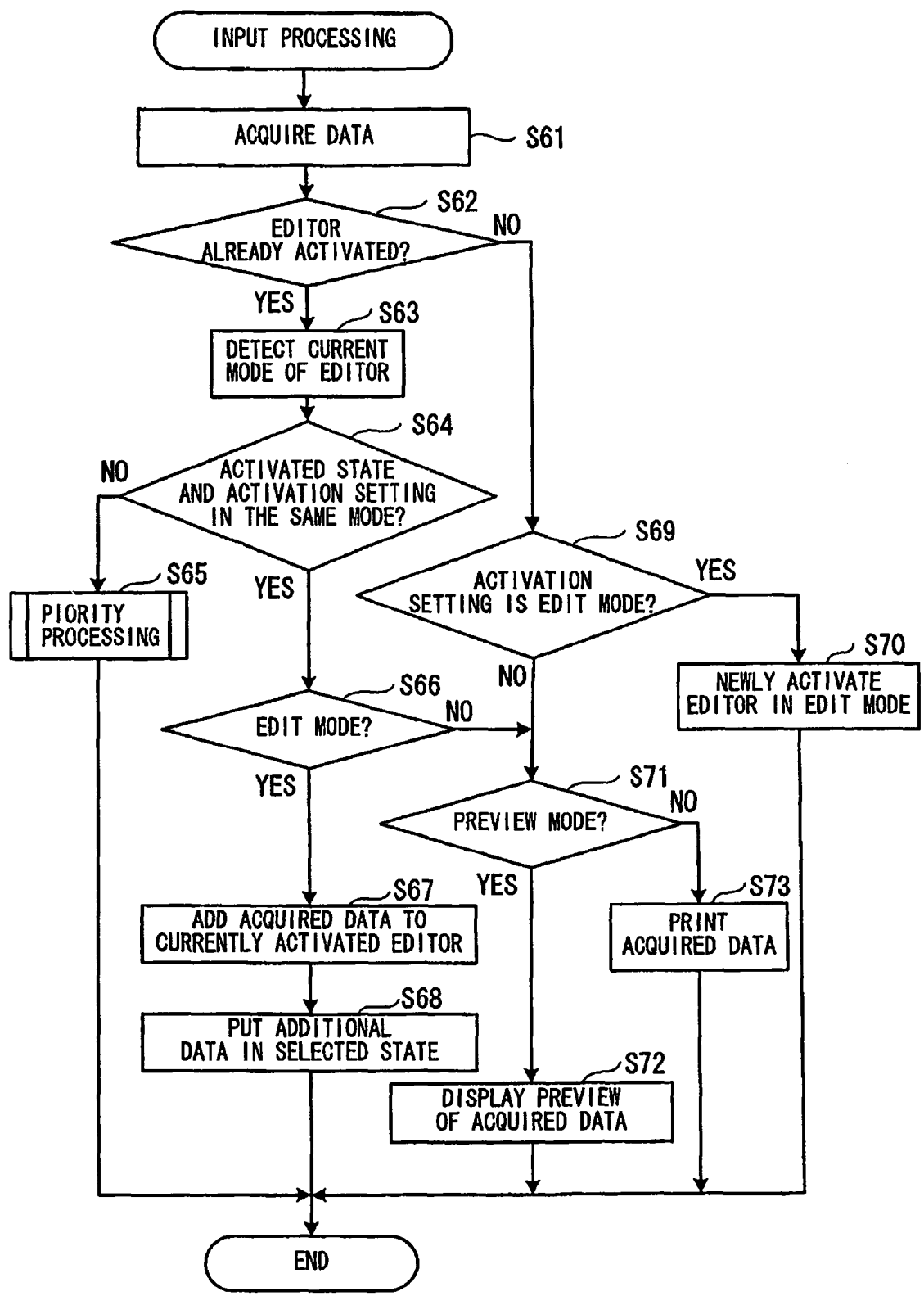
FIG. 12 is a flowchart of the data input processing in a case where priority setting is employed.

Next, data input processing in a case where a priority setting is used is described with reference to FIG. 12. As shown in FIG. 12, when the data input processing starts, first data selected in the spreadsheet application 200 is acquired (S61). Next, the process determines whether the editor 100 is already activated (S62).

If the editor 100 is already activated (YES at S62) the process detects a current mode of the activated editor (S63). The process determines whether the detected mode, that is, a currently activated state of the editor, is the same as an activation mode set in the activation setting processing (S64). If such is not the case (NO at S64), the process performs priority processing that prioritizes processing in a prioritized mode in accordance with a setting of the priority setting processing (S65), to end the processing. The priority processing is detailed later with reference to FIG. 13.

If the activated state and the activation mode are in the same mode (YES at S64), the process determines whether the mode is the edit mode (S66). If it is the edit mode (YES at S66), the data acquired by the already activated editor 100 at S61 is added (S67) and this added data is put in a selected state and displayed on the edit screen 110 as shown in FIG. 9 (S68), to end the processing.

If the activated state and the activation mode are the same as each other (YES at S64) and this mode is not the edit mode (NO at S66), the process determines whether that mode is the preview mode (S71). If it is the preview mode (YES at S71), the process displays the preview screen 120 (see FIG. 5) that indicates the print image 140 having the data acquired at S61 as contents of the object 210 (S72), to end the processing.

If the activated state and the activation mode are the same as each other (YES at S64) and this mode is neither the edit mode nor the preview mode (NO at S66, NO at S71), this mode must be the direct print mode, so that a command signal is transmitted to the printer 1 so that the data acquired at step S61 may be printed (S73), to end the processing.

If, on the other hand, the editor is not activated (NO at S62), the process determines whether the activation setting is the edit mode (S69). If the activation setting is the edit mode (YES at S69), the editor 100 is activated newly, so that the data acquired at S61 is input as a record of the database display region 160 on the edit screen 110 and displayed in a condition where it is reflected on the print image 140 in the working area 150 (S70), to end the processing.

If the activation setting is not the edit mode (No at S69) but the preview mode (YES at S71), the process displays the preview screen 120 (see FIG. 5) that shows the print image 140 having the data acquired at S61 as contents of the object 210 (S72), to end the processing.

If the activation setting is the direct print mode (NO at S69, NO at S71), a command signal is transmitted to the printer 1 so that the data acquired at S61 may be printed (S73), to end the processing.

Figure 13:
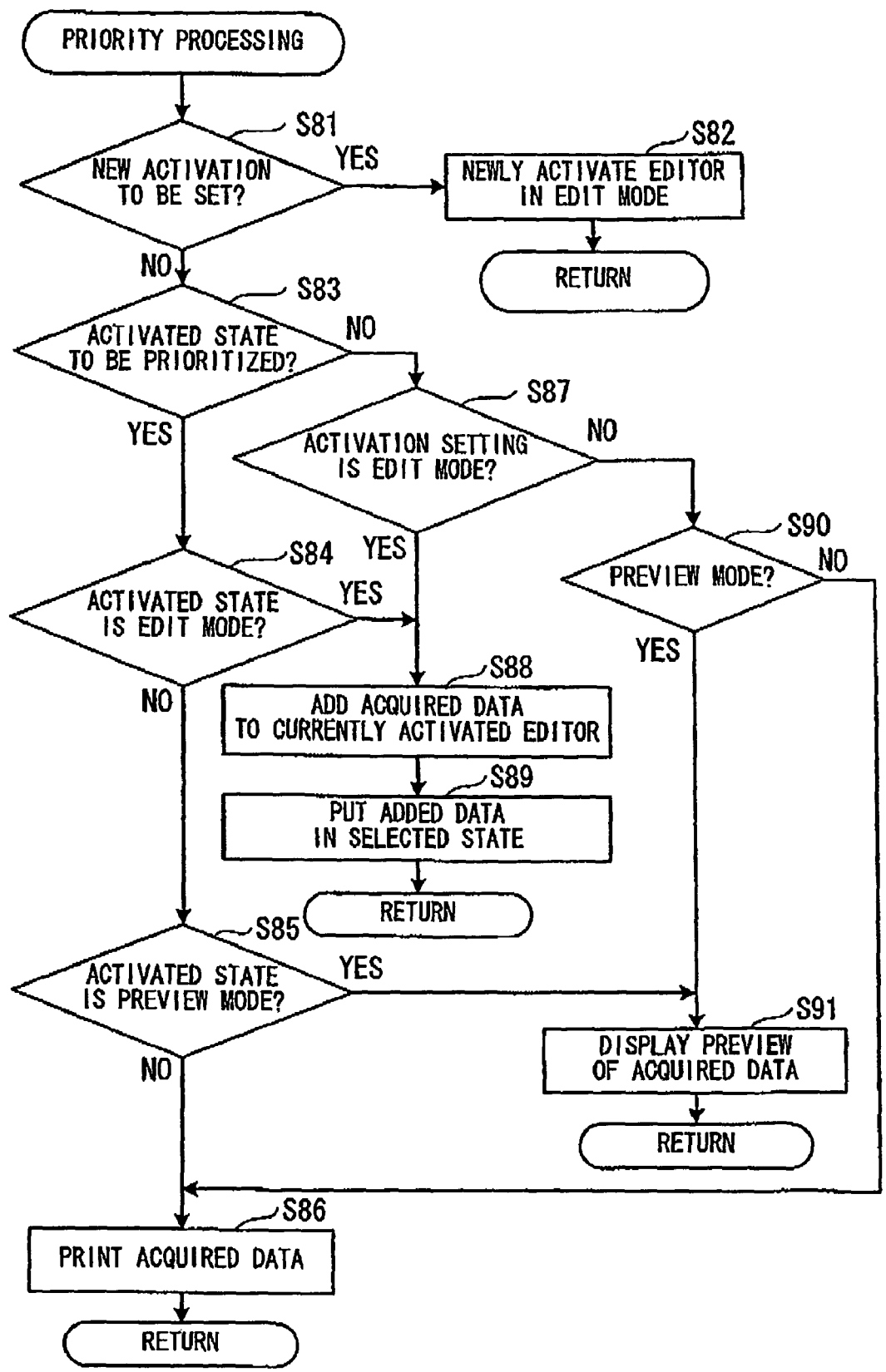
FIG. 13 is a flowchart of a subroutine of priority processing to be performed in the data input processing that employs the priority setting.

Next, referring to FIG. 13, priority processing is described which is performed at S65 of FIG. 12 if an activated state is different from an activation setting. First, the process determines whether the contents of a priority setting prioritizes a new activation setting (S81). If such is the case (YES at S81), the editor 100 is activated newly, so that data acquired at S61 is input as a record of the database display region 160 on the edit screen 110 and displayed in a condition where it is reflected on the print image 140 in the working region 150 (S82), then the process returns to a data input processing routine of FIG. 12.

If the priority setting does not prioritize the new activation setting (NO at S81), the process determines whether the setting prioritizes an activated state (S83). If the activated state is set to be prioritized (YES at S83), the process determines whether the currently activated state is the edit mode (S84). If it is the edit mode (YES at S84) the data acquired at S61 of FIG. 12 is added to the already activated editor 100 (S88) and this added data is put in a selected state and displayed on the edit screen 110 as shown in FIG. 9 (S89). Then, the process returns to the data input processing of FIG. 12.

If the priority setting prioritizes an activated state (YES at S83) and the currently activated state is not the edit mode (NO at S84), the process determines whether the editor is activated in the preview mode (S85). If the activated state is the preview mode (YES at S85), the process displays the preview screen 120 (see FIG. 5) that shows the print image 140 having the data acquired at S61 of FIG. 12 as contents of the object 210 (S91) and returns to the data input processing routine of FIG. 12.

If the priority setting prioritizes an activated state (YES at S83) and the currently activated state is not the edit mode nor the preview mode (NO at S84, NO at S85), the set activation mode must be the direct print mode, so that a command signal is transmitted to the printer 1 so that the data acquired at S61 of FIG. 12 may be printed (S86), then the process returns to the data input processing routine of FIG. 12.

On the other hand, if the priority setting does not prioritize an activated state (NO at S83), a setting made in the activation setting processing is prioritized, so that the process determines whether this activation setting is the edit mode (S87). If the activation setting is the edit mode (YES at S87), the data acquired at S61 is added to the already activated editor 100 (S88) and this added data is put in a selected state and displayed on the edit screen 110 as shown in FIG. 9 (S89). Then, the processing returns to the data input processing routine of FIG. 12.

If the activation setting is not the edit mode (No at S87), the process determines whether the activation setting is the preview mode (S90). If it is the preview mode (YES at S90), the process displays the preview screen 120 (see FIG. 5) that shows the print image 140 having the data acquired at S61 of FIG. 12 as contents of the object 210 (S91) and returns to the data input processing routine of FIG. 12.

If the activation setting is not the preview mode (NO at S90), the set activation mode must be the direct print mode, so that a command signal is transmitted to the printer 1 so that the data input at S61 of FIG. 12 may be printed (S86) and then the processing returns to the data input processing routine of FIG. 12.

As described above, according to the present variant, if the editor 100 is already activated when the mouse is clicked on the ADD-IN button 250 by the spreadsheet application 200, there may be a case where a mode in which it is activated (activated state) may be different from an activation mode which is set in activation setting, so that the operator can predefine which of these modes should be prioritized as a priority setting (a preferential mode) in such a case. Data is input according to this priority setting, so that the operator can select a method he likes in execution of the data input processing.

As described above, according to an information processor of the disclosure, when an input is given through activation command input device, determining device checks whether a second application is currently activated and, if such is the case, activation control device adds data selected by a first application to the existing data hitherto accumulated in the second application without newly activating the second application. Therefore, a task with the second application can be performed without possible confusion due to a plurality of times of activation of the second application or without losing data of hitherto performed tasks.

According to the information processor of the disclosure, through setting of an activation mode, regardless of a currently activated mode, if the activation mode is a print image display mode, additional data is to be subject to print image display, and if the activation mode is an edit mode, additional data is displayed in a condition where the additional data can be edited. Therefore, a task can be performed on selected data in a desired activation mode while adding data to the already activated second application.

According to the information processor of the disclosure, if a set activation mode is different from a current mode of an already activated second application, a mode to be prioritized after additional data is input is determined as a preferential mode beforehand. If the second application is activated in a mode different from the preferential mode, switchover is made to the preferential mode, to input data and display it. Therefore, the operator can appropriately determine a mode to be prioritized in input, thereby making processing flexible.

As described above, according to an information processor of the disclosure, when an input is given through activation command input device, the controller checks whether a second application is currently activated and, if such is the case, the controller adds data selected by a first application to the existing data hitherto accumulated in the second application without newly activating the second application. Therefore, a task with the second application can be performed without possible confusion due to a plurality of times of activation of the second application or without losing data of hitherto performed tasks.

According to the information processor of the disclosure, through setting of an activation mode, regardless of a currently activated mode, if the activation mode is a print image display mode, additional data is to be subject to print image display, and if the activation mode is an edit mode, additional data is displayed in a condition where the additional data can be edited. Therefore, a task can be performed on selected data in a desired activation mode while adding data to the already activated second application.

According to the information processor of the disclosure, if a set activation mode is different from a current mode of an already activated second application, a mode to be prioritized after additional data is input is determined as a preferential mode beforehand. If the second application is activated in a mode different from the preferential mode, switchover is made to the preferential mode, to input data and display it. Therefore, the operator can appropriately determine a mode to be prioritized in input, thereby making processing flexible.

According to an information processing program of the disclosure, if an input is given in an activation command input step, a determining step checks whether a second application is currently activated and, if such is the case, an activation control step adds data selected by a first application to the existing data hitherto accumulated in the second application without newly activating the second application. Therefore, a task with the second application can be performed without possible confusion due to a plurality of times of activation of the second application or without losing data of hitherto performed tasks.

According to the information processing program of the disclosure, through setting of an activation mode, irrespective of a currently activated mode, if the activation mode is a print image display mode, additional data is to be subject to print image display, and if the activation mode is an edit mode, additional data is displayed in a condition where the additional data can be edited. Therefore, a task can be performed on selected data in a desired activation mode as adding data to the already activated second application.

According to the information processing program of the disclosure, if a set activation mode is different from a current mode of an already activated second application, a mode to be prioritized after additional data is input is determined as a preferential mode beforehand. If the second application is activated in a mode different from the preferential mode, switchover is made to the preferential mode, to input data and display it. Therefore, the operator can appropriately determine a mode to be prioritized in inputting, thereby making processing flexible.

Although the invention has been described with reference to exemplary embodiments, it is to be understood that the invention is not limited to the exemplary embodiments or structures. Though the various elements of the exemplary embodiments are shown in various combinations and configurations, which are exemplary, other combinations and configurations, including more, less or only a single element, are also within the spirit and scope of the disclosure.

What is claimed is:

1. An information processor comprising:
   a display that includes a display screen;
   a controller that:
   presets in which one of a plurality of modes of a second application is to be activated, including an edit mode and a print image display mode;
   acquires data selected in a first application;
   inputs the acquired data in addition to data already accumulated in the second application currently activated;
   wherein, said controller:
   detects the current mode of the second application;
   sets a mode to be prioritized in the second application if a set activation mode and a detected detection mode are different from each other; and
   switches from the detection mode to a preferential mode in the second application, if the detection mode detected by the controller is different from the preferential mode set by the controller;
   the processor further comprising:
      an activation command input device that inputs a command causing the first application to activate the second application;
      said controller:
         presets in which one of a plurality of modes of the second application is to be activated based on input from the activation command input device;
         decides whether the second application is already activated when having received the input from the activation command input device; and
         activates, in accordance with an input from the activation command input device, the second application in a condition where the acquired data is input, if the second application is not already activated;
   wherein said preferential mode is set by a user through a setting screen, said setting screen defining priority settings including a first setting of whether an activation set value is preferred and a second setting of whether an activated state is preferred;
   wherein:
      if the priority setting prioritizes an activation set value, then the activation set mode by the controller is prioritized, and
      if the priority setting prioritizes an activated state, then the current mode of the second application detected by the controller is prioritized.

2. The processor of claim 1, wherein said edit mode and said print image display mode are selectable by a user through a setting screen which is displayed on the display.

3. A non-transitory computer readable medium storing an information processing program, said program comprising instructions causing a computer to perform the steps of:
   a display step of performing display;
   an activation mode setting step of presetting in which one of a plurality of modes of a second application is to be activated, including an edit mode and a print image display mode;
   an acquisition step of acquiring data selected in a first application;
   a data addition step of inputting the data acquired in the acquisition step in addition to data already accumulated in the second application currently activated;
   said computer performs the steps of:
   a mode detection step of detecting the current mode of the second application;
   a preferential mode setting step of setting a mode to be prioritized is an activation mode set in the activation mode setting step and a detection mode detected in the mode detection step are different from each other; and
   a switchover step of switching from the detection mode to a preferential mode, if the detection mode detected in the mode detection step is different from the preferential mode set in the preferential mode setting step;
   wherein said program instructions causes the computer to perform the further steps of:
      an activation command input step of inputting a command causing the first application to activate the second application;
      said activation mode setting step presets in which one of a plurality of modes of the second application is to be activated based on input given in the activation command input step;
      a determining step of determining whether the second application is already activated, when having received the input in the activation command input step; and
      an activation control step of activating, in accordance with an input in the activation command input step, the second application in a condition where the data acquired in the acquisition step is input, if the second application is not already activated;
   wherein in said program, said preferential mode is set by a user through a setting screen, said setting screen defining priority settings including a first setting of whether an activation set value is preferred and a second setting of whether an activated state is preferred;
   wherein in said program:
      if the priority setting prioritizes an activation set value, then the activation set mode by the controller is prioritized, and
      if the priority setting prioritizes an activated state, then the current mode of the second application detected by the controller is prioritized.

4. The medium of claim 3, wherein in said program, said edit mode and said print image display mode are selectable by a user through a setting screen which is displayed on the display.

* * * * *